(12) United States Patent
Griffin et al.

(10) Patent No.: US 12,406,047 B2
(45) Date of Patent: Sep. 2, 2025

(54) QUANTUM AUTHENTICATION OF PROTECTED RESOURCES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 589 days.

(21) Appl. No.: 17/676,672

(22) Filed: Feb. 21, 2022

(65) Prior Publication Data

US 2023/0267191 A1    Aug. 24, 2023

(51) Int. Cl.
*G06F 21/44* (2013.01)
*G06N 10/40* (2022.01)

(52) U.S. Cl.
CPC ............ *G06F 21/44* (2013.01); *G06N 10/40* (2022.01)

(58) Field of Classification Search
CPC ................................ G06F 21/44; G06N 10/40
See application file for complete search history.

(56) References Cited

U.S. PATENT DOCUMENTS

| | | | |
|---|---|---|---|
| 9,887,976 B2 | 2/2018 | Hughes et al. | |
| 10,880,089 B2 | 12/2020 | Brown et al. | |
| 2019/0238326 A1* | 8/2019 | Ji | H04L 9/0861 |
| 2020/0252215 A1 | 8/2020 | Hughes et al. | |
| 2021/0111898 A1* | 4/2021 | McCarty | H04L 9/3213 |

FOREIGN PATENT DOCUMENTS

| CN | 106685654 B | 10/2020 |
|---|---|---|
| CN | 106664194 B | 3/2021 |

OTHER PUBLICATIONS

Curty, M. et al., "Quantum authentication of classical messages," Physical Review A, vol. 64, Jun. 23, 2009, 2001, The American Physical Society, 6 pages.

Sharma, M. et al., "Two-factor authentication using biometric based quantum operations," Security and Privacy, vol. 3, Issue 3, Jan. 2020, John Wiley & Sons, 37 pages.

* cited by examiner

*Primary Examiner* — Emmanuel L Moise
*Assistant Examiner* — Xiang Yu
(74) *Attorney, Agent, or Firm* — Dority & Manning, P.A.

(57) ABSTRACT

An access request to allow a requestor process to access a protected resource is received. A qubit authentication state that identifies a desired state of a qubit is sent to the requestor process. It is determined that the requestor process has caused the qubit to have the qubit authentication state. Based at least in part on determining that the requestor process has caused the qubit to have the qubit authentication state, the requestor process is granted access to the protected resource.

20 Claims, 9 Drawing Sheets

QUANTUM AUTHENTICATION OF PROTECTED RESOURCES

BACKGROUND

As quantum computing becomes more prevalent, it is increasingly important to ensure that quantum computing environments are secure.

SUMMARY

The examples disclosed herein implement quantum authentication of protected resources.

In one example a method is provided. The method includes receiving, by a computing device including a processor device, an access request to allow a requestor process to access a protected resource. The method further includes sending, by the computing device to the requestor process, a qubit authentication state that identifies a desired state of a qubit. The method further includes determining, by the computing device, that the requestor process has caused the qubit to have the qubit authentication state. The method further includes, based at least in part on determining that the requestor process has caused the qubit to have the qubit authentication state, granting, by the computing device to the requestor process, access to the protected resource.

In another example another method is provided. The method includes receiving, by a computing device including a processor device, an access request to allow a requestor process to access a protected resource. The method further includes sending, by the computing device to a first quantum computing system, a request for a quantum authentication. The method further includes receiving, by the computing device from the first quantum computing system, a qubit authentication state that identifies a desired state of a qubit. The method further includes sending, by the computing device to the requestor process, the qubit authentication state. The method further includes receiving, by the computing device from the first quantum computing system, a successful quantum authentication message indicating a successful quantum authentication by the requestor process. The method further includes, based at least in part on the successful quantum authentication message, granting, by the computing device to the requestor process, access to the protected resource.

In another example a computing device is provided. The computing device includes a memory, and a processor device coupled to the memory. The processor device is to receive an access request to allow a requestor process to access a protected resource. The processor device is further to send, to the requestor process, a qubit authentication state that identifies a desired state of a qubit. The processor device is further to determine that the requestor process has caused the qubit to have the qubit authentication state. The processor device is further to, based at least in part on determining that the requestor process has caused the qubit to have the qubit authentication state, grant, to the requestor process, access to the protected resource.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As quantum computing becomes more prevalent, it is increasingly likely that hacking and other nefarious activities will focus on quantum computing environments. A quantum computing system can typically operate in both a classical computing mode, where data is represented in the binary values of 0 and 1, and in a quantum computing mode, where computations utilize quantum-mechanical phenomena, such as superposition and entanglement. A nefarious process that enters a quantum computing system may have been designed for classical computing device environments but ultimately spread to the quantum computing system.

The examples disclosed herein implement quantum authentication of protected resources. In particular, a process that requests access to a protected resource, such as an online service, a web page, a file, a database, or the like, must establish that the process has the capability of manipulating a qubit in a specified manner in order to be granted access to the protected resource. Nefarious programs that do not have the capability of manipulating a qubit are thus prevented from accessing a protected resource.

Figure 1:
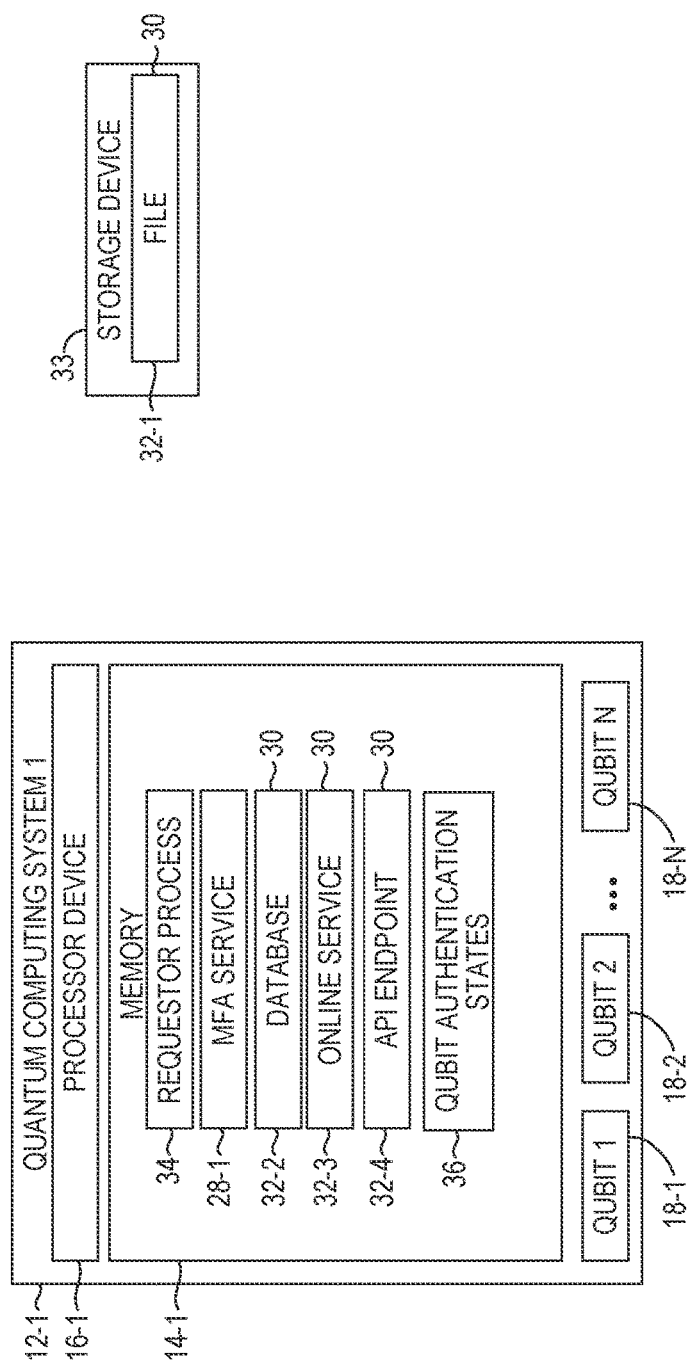
FIG. 1 is a block diagram of an environment suitable for implementing quantum authentication of protected resources according to one implementation.

FIG. 1 is a block diagram of an environment 10 suitable for implementing quantum authentication of protected resources according to one example. The environment 10 includes a computing device, such as a quantum computing system 12-1 which includes a memory 14-1, a processor device 16-1, and implements a plurality of qubits 18-1-18-N. The quantum computing system 12-1 operates in a quantum environment but is capable of operating using classical computing principles or quantum computing principles. When using quantum computing principles, the quantum computing system 12-1 performs computations that utilize quantum-mechanical phenomena, such as superposition and/or entanglement states. The quantum computing system 12-1 may operate under certain environmental conditions, such as at or near zero degrees (0°) Kelvin. When using classical computing principles, the quantum computing system 12-1 utilizes binary digits that have a value of either zero (0) or one (1).

The quantum computing system 12-1 includes a multi-factor authentication (MFA) service 28-1 that is configured to ensure that a process that requests access to a protected resource 30, in this example a file 32-1 stored on a storage device 33, is properly authenticated prior to being granted permission to access the file 32-1. The term "access" in the context of the file 32-1 may mean, for example, reading the file 32-1, modifying the file 32-1, copying the file 32-1, deleting the file 32-1, or any other manipulation or action associated with the file 32-1. The examples disclosed herein may operate with any type of protected resource 30 for which protection may be desirable, such as, by way of non-limiting example, a database 32-2, an online service 32-3, or an application programming interface (API) endpoint 32-4, and the term "access" may differ depending on the particular protected resource 30. For example, with regard to the database 32-2, the MFA service 28-1 may prohibit reads, writes, modifications, or deletes unless first authenticated by the MFA service 28-1. With regard to the online service 32-3, the MFA service 28-1 may prohibit logging into the online service 32-3 unless first authenticated by the MFA service 28-1. With regard to the API endpoint 32-4, the MFA service 28-1 may prohibit invoking the API endpoint 32-4 unless first authenticated by the MFA service 28-1.

In this example, a requestor process 34 attempts to access the file 32-1. The word "requestor" in the term "requestor process" is used solely to refer to the action of the process, and any process that desires access to a resource can be a requestor process. As part of the attempt to access the file 32-1, the MFA service 28-1 is invoked. The MFA service 28-1 may initially send the requestor process 34 a request for a classical authentication, such as a request for a user identifier and a password, or any other desirable authentication mechanism used on classical computing devices to authenticate a process. In response, the requestor process 34 sends authentication information to the MFA service 28-1. The MFA service 28-1, in this example, determines that the authentication information is valid.

The MFA service 28-1 then initiates a quantum authentication. The MFA service 28-1 generates a qubit authentication state. The qubit authentication state is a state of a qubit into which the requestor process 34 will be asked to place a qubit. The qubit authentication state may comprise a particular spin state, polarization state, or any other attribute or state of a qubit. In some implementations, the qubit authentication state may comprise a textual identifier that the requestor process is to store in the qubit. In some examples, the MFA service 28-1 may access qubit authentication states 36 to determine the qubit authentication state. The qubit authentication states 36 may comprise a plurality of entries, each of which identifies a different qubit authentication state, such as a different combination of spin state, polarization state, and/or other physical characteristic of qubit. The MFA service 28-1 may randomly select an entry in the qubit authentication states 36 to determine the qubit authentication state.

The MFA service 28-1 may then reserve an available qubit, such as the qubit 18-1. The MFA service 28-1 provides, to the requestor process 34, a qubit identifier that identifies the qubit 18-1, and the qubit authentication state. The requestor process 34 receives the qubit identifier that identifies the qubit 18-1, and the qubit authentication state, and performs the desired manipulations on the qubit 18-1 to place the qubit 18-1 into the qubit authentication state. The requestor process 34 may inform the MFA service 28-1 that the requestor process 34 has caused the qubit 18-1 to have the qubit authentication state, or, alternatively, the MFA service 28-1 may monitor the qubit 18-1 to determine that the qubit 18-1 has been modified.

The MFA service 28-1 determines the physical characteristics of the qubit 18-1 and compares the physical characteristics to the qubit authentication state previously sent to the requestor process 34. In this example, the MFA service 28-1 determines that the physical characteristics match the qubit authentication state. In response to this determination, the MFA service 28-1 grants the requestor process 34 access to the file 32-1. If the MFA service 28-1 had determined that the physical characteristics did not match the qubit authentication state, the MFA service 28-1 would deny the requestor process 34 access to the protected resource 30.

In some examples, after providing the qubit identifier that identifies the qubit 18-1 and the qubit authentication state to the requestor process 34, the MFA service 28-1 may set a timer for a determined period of time, such as 5 seconds, 10 seconds, or any other suitable interval. If the requestor process 34 does not manipulate the qubit 18-1 by the time the timer expires, the MFA service 28-1 denies access to the protected resource 30 by the requestor process 34.

It is noted that, because the MFA service 28-1 is a component of the quantum computing system 12-1, functionality implemented by the MFA service 28-1 may be attributed to the quantum computing system 12-1 generally. Moreover, in examples where the MFA service 28-1 comprises software instructions that program the processor device 16-1 to carry out functionality discussed herein, functionality implemented by the MFA service 28-1 may be attributed herein to the processor device 16-1.

Figure 2:
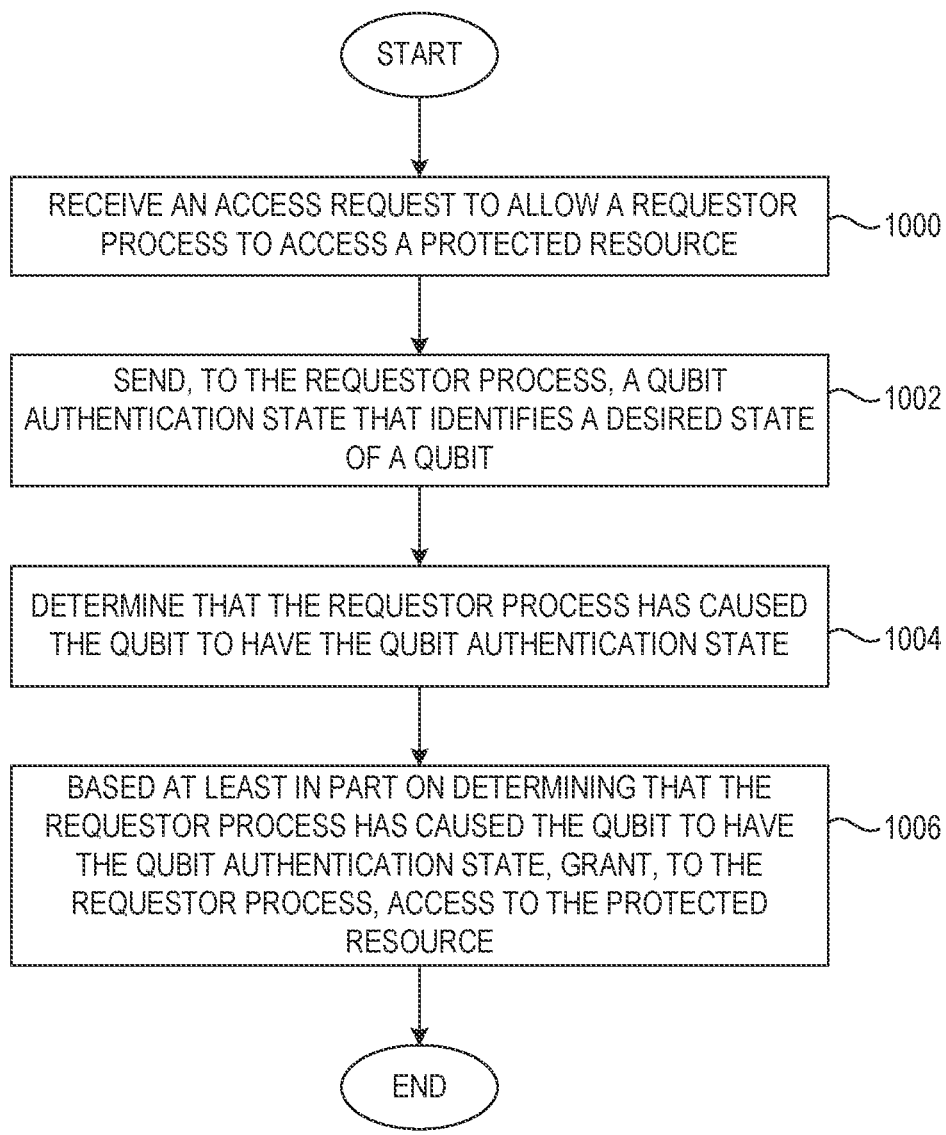
FIG. 2 is a flowchart of a method for quantum authentication of protected resources according to one implementation.

FIG. 2 is a flowchart of a method for quantum authentication of protected resources according to one implementation. FIG. 2 will be discussed in conjunction with FIG. 1. The quantum computing system 12-1 receives, from the requestor process 34, an access request to allow the requestor process 34 to access a protected resource 30 (FIG. 2, block 1000). The quantum computing system 12-1 sends, to the requestor process 34, a qubit authentication state that identifies a desired state of a qubit (FIG. 2, block 1002). The quantum computing system 12-1 determines that the requestor process 34 has caused the qubit 18-1 to have the qubit authentication state (FIG. 2, block 1004). Based at least in part on determining that the requestor process 34 has caused the qubit 18-1 to have the qubit authentication state, the quantum computing system 12-1 grants the requestor process 34 access to the protected resource 30 (FIG. 2, block 1006).

Figure 3:
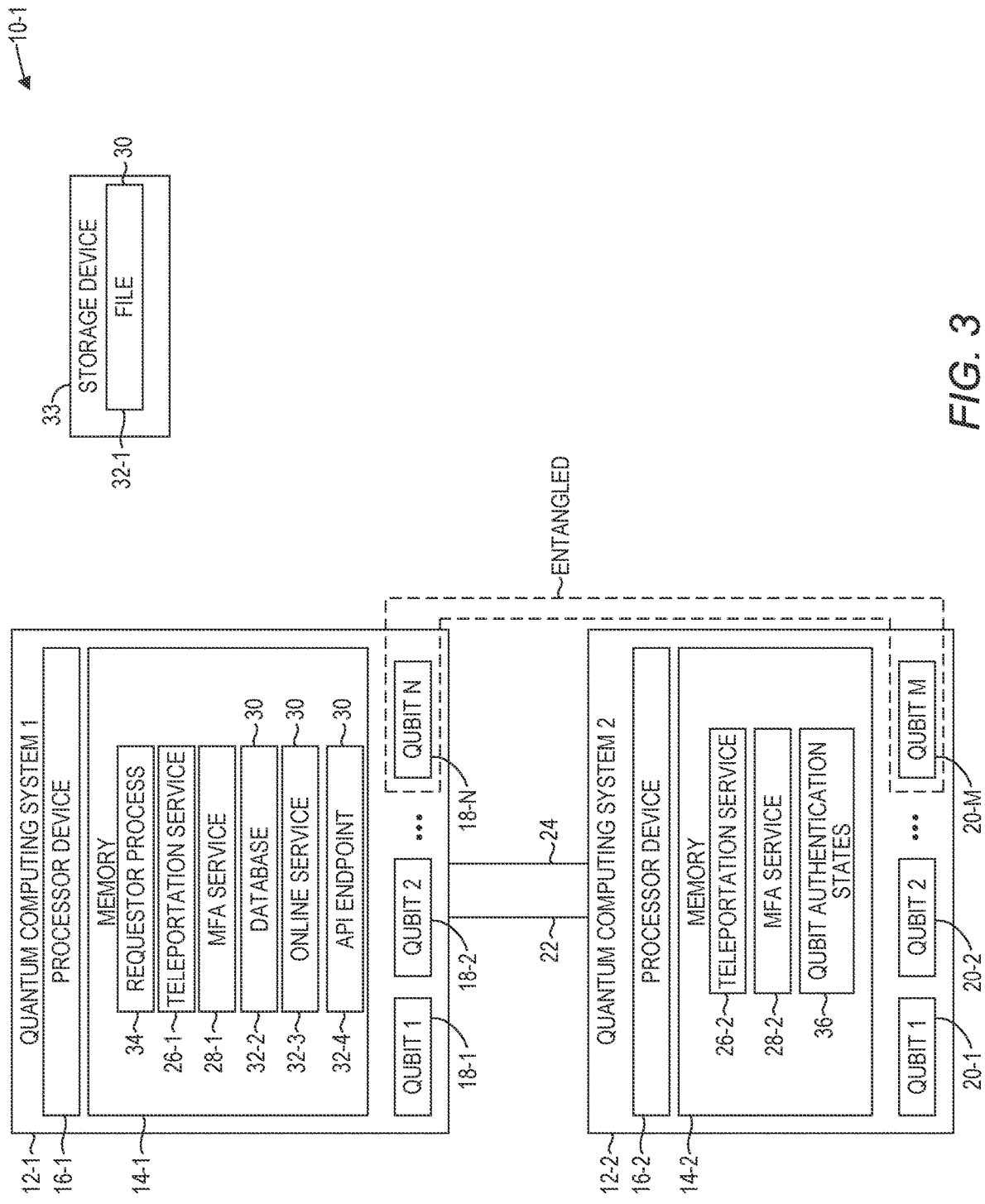
FIG. 3 is a block diagram of an environment suitable for implementing quantum authentication of protected resources according to another implementation.

FIG. 3 is a block diagram of an environment 10-1 suitable for implementing quantum authentication of protected resources according to another example. The environment 10-1 includes the quantum computing system 12-1 and a quantum computing system 12-2. The quantum computing system 12-2 includes a memory 14-2, a processor device 16-2, and implements a plurality of qubits 20-1-20-M.

The quantum computing system 12-2 operates in a quantum environment, but is capable of operating using classical computing principles or quantum computing principles. When using quantum computing principles, the quantum computing system 12-2 performs computations that utilize quantum-mechanical phenomena, such as superposition and/or entanglement states. The quantum computing system 12-2 may operate under certain environmental conditions, such as at or near zero degrees (0°) Kelvin. When using classical computing principles, the quantum computing system 12-2 utilizes binary digits that have a value of either zero (0) or one (1).

The quantum computing systems 12-1 and 12-2 are communicatively coupled to one another via a classical communications channel 22 and via a quantum communications channel 24 over which physical properties of qubits may be communicated via, for example, quantum teleportation. The quantum computing systems 12-1 and 12-2 may be in physical proximity to one another or may be separated by a substantial distance.

In this example, the quantum computing system 12-1 includes a teleportation service 26-1 and the quantum computing system 12-2 includes a teleportation service 26-2 (generally, teleportation services 26). The teleportation services 26 are configured to, upon request, cause a qubit 18 implemented by the quantum computing system 12-1 to become entangled with a qubit 20 implemented by the quantum computing system 12-2. The teleportation services 26 are also configured to, upon request, cause the physical attributes of a qubit 18 to be teleported from the quantum computing system 12-1 to the quantum computing system 12-2 using the entangled pair of qubits 18, 20 via, for example, bell states. In this example, the teleportation services 26-1 and 26-2 have caused the qubit 18-N and the qubit 20-M to become entangled.

In this example, the requestor process 34 attempts to access the file 32-1. As part of the attempt to access the file 32-1, the MFA service 28-1 is invoked. The MFA service 28-1 may initially send the requestor process 34 the request for the classical authentication, such as a user identifier and a password, or any other desirable authentication mechanism used on classical computing devices to authenticate a process. In response, the requestor process 34 sends authentication information to the MFA service 28-1. The MFA service 28-1, in this example, determines that the authentication information is valid. The MFA service 28-1 then initiates a quantum authentication. In particular, the MFA service 28-1 sends a request for quantum authentication to an MFA service 28-2 on the quantum computing system 12-2.

The MFA service 28-2 receives the request for quantum authentication and generates a qubit authentication state. In some examples, the MFA service 28-2 may access the qubit authentication states 36 to determine the qubit authentication state. The MFA service 28-2 sends the qubit authentication state to the MFA service 28-1. The MFA service 28-1 receives the qubit authentication state that identifies the desired state of the qubit. The MFA service 28-1 may then reserve an available qubit, such as the qubit 18-1. The MFA service 28-1 provides, to the requestor process 34, a qubit identifier that identifies the qubit 18-1, and the qubit authentication state. The requestor process 34 receives the qubit identifier that identifies the qubit 18-1, and the qubit authentication state, and performs the desired manipulations on the qubit 18-1 to place the qubit 18-1 in the qubit authentication state. The requestor process 34 may inform the MFA service 28-1 that the requestor process 34 has caused the qubit 18-1 to have the qubit authentication state.

The MFA service 28-1 invokes the teleportation service 26-1 identifying the qubit 18-1. The teleportation service 26-1, using the quantum communications channel 24 and the entangled qubit 18-N, teleports the physical characteristics of the qubit 18-1 to the qubit 20-M. The MFA service 28-2 determines that the qubit 20-M has been altered. The MFA service 28-2 determines the physical characteristics of the qubit 20-M and compares the physical characteristics to the qubit authentication state previously sent to the MFA service 28-1. In this example, the MFA service 28-2 determines that the physical characteristics match the qubit authentication state. In response to this determination, the MFA service 28-2 sends a successful quantum authentication message to the MFA service 28-1. The MFA service 28-1 receives the successful quantum authentication message and grants the requestor process 34 access to the file 32-1.

It is noted that, because the MFA service 28-2 is a component of the quantum computing system 12-2, functionality implemented by the MFA service 28-2 may be attributed to the quantum computing system 12-2 generally. Moreover, in examples where the MFA service 28-2 comprises software instructions that program the processor device 16-2 to carry out functionality discussed herein, functionality implemented by the MFA service 28-2 may be attributed herein to the processor device 16-2.

Figure 4:
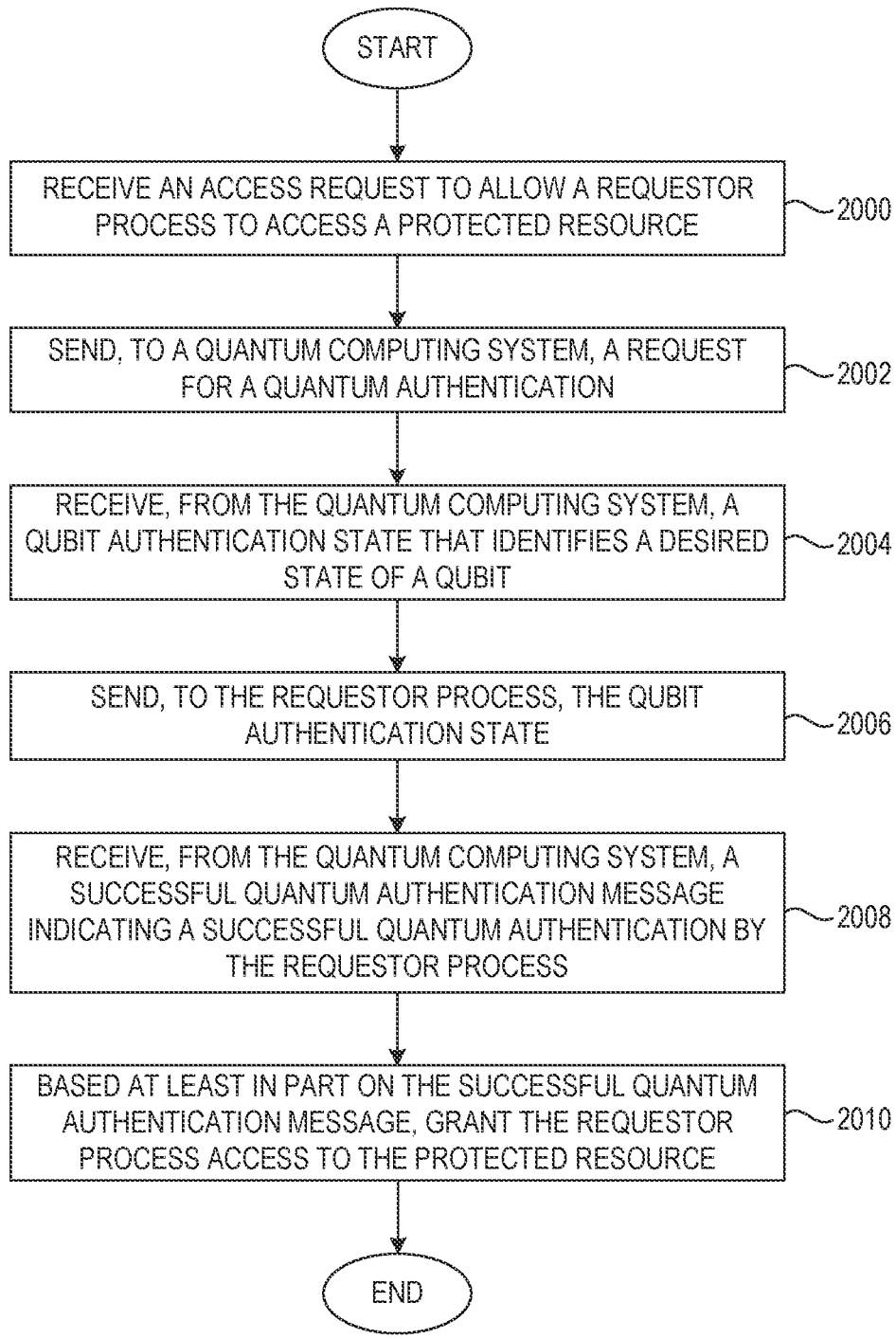
FIG. 4 is a flowchart of a method for quantum authentication of protected resources according to another implementation.

FIG. 4 is a flowchart of a method for quantum authentication of protected resources according to one implementation. FIG. 4 will be discussed in conjunction with FIG. 3. The quantum computing system 12-1 receives, from the requestor process 34, an access request to allow the requestor process 34 to access a protected resource 30 (FIG. 4, block 2000). The quantum computing system 12-1 sends, to the quantum computing system 12-2, a request for a quantum authentication (FIG. 4, block 2002). The quantum computing system 12-1 receives, from the quantum computing system 12-2, a qubit authentication state that identifies a desired state of a qubit (FIG. 4, block 2004). The quantum computing system 12-1 sends, to the requestor process 34, the qubit authentication state (FIG. 4, block 2006). The quantum computing system 12-1 receives, from the quantum computing system 12-2, a successful quantum authentication message indicating a successful quantum authentication by the requestor process 34 (FIG. 4, block 2008). The quantum computing system 12-1, based at least in part on the successful quantum authentication message, grants, to the requestor process 34, access to the protected resource (FIG. 4, block 2010).

Figure 5A:
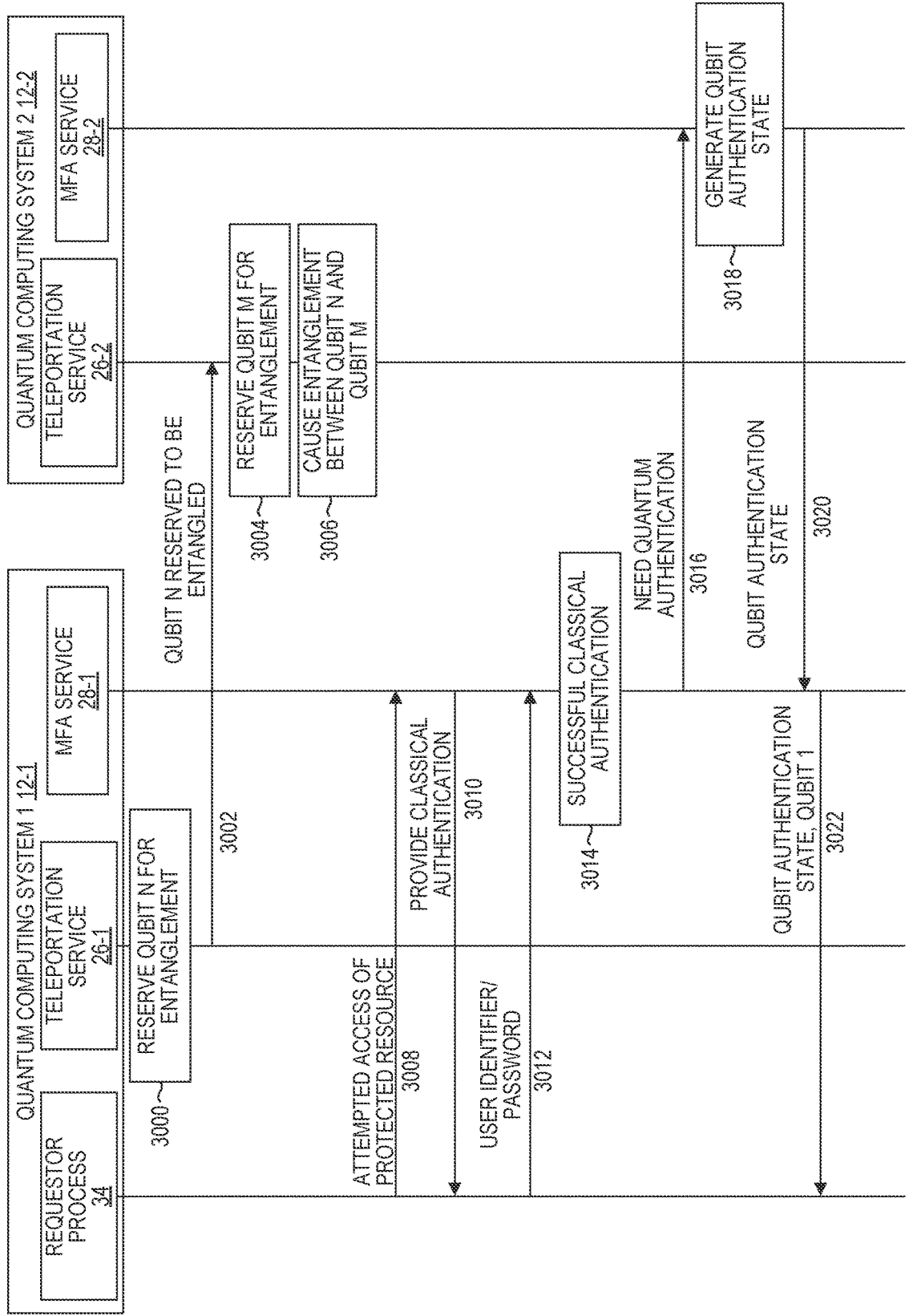
FIGS. 5A-5B illustrate a sequence diagram illustrating actions taken and messages communicated by various components illustrated in FIG. 3 to implement quantum authentication of protected resources according to one implementation.
Figure 5B:
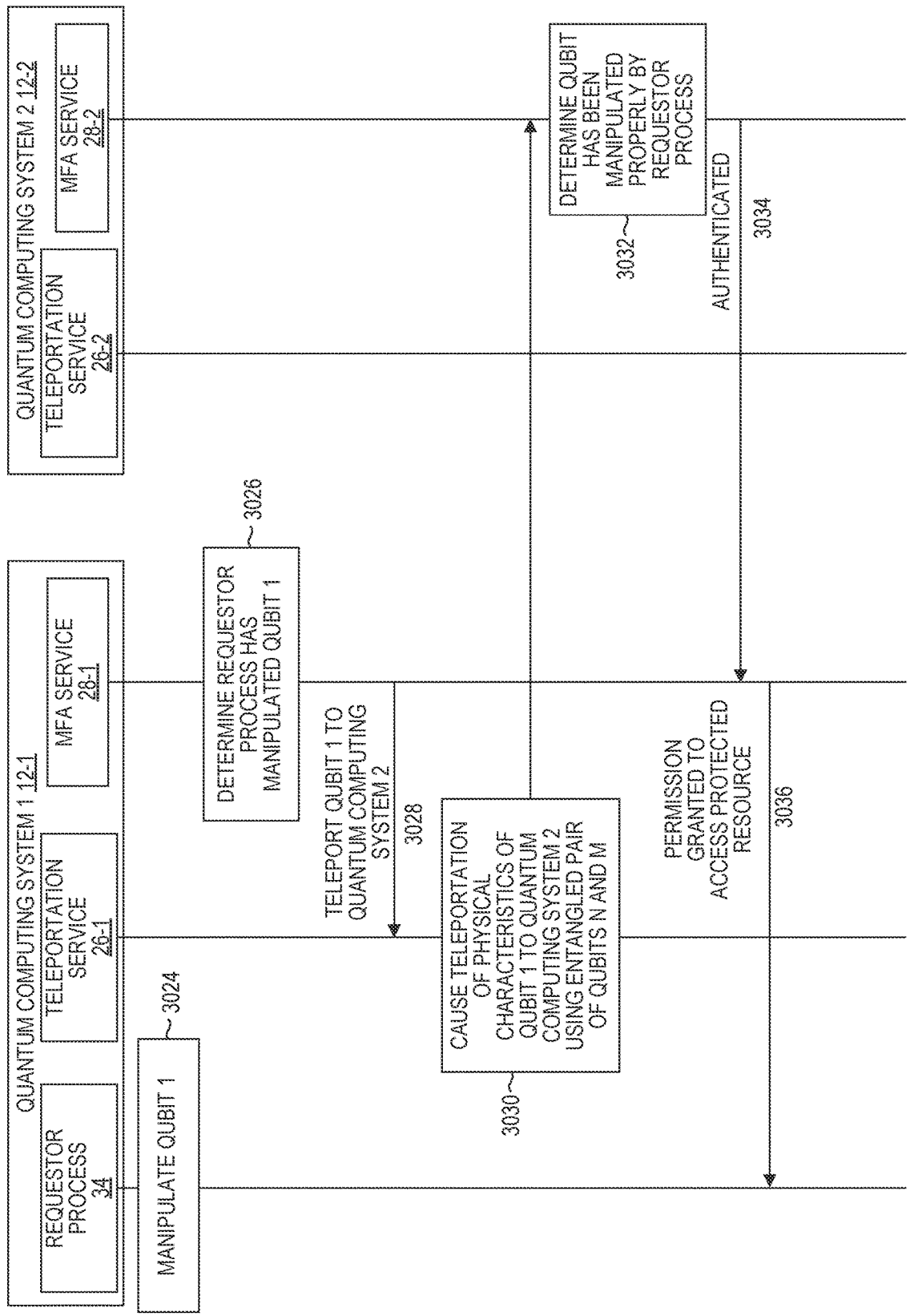

FIGS. 5A-5B illustrate a sequence diagram illustrating actions taken and messages communicated by various components illustrated in FIG. 3 to implement quantum authentication of protected resources according to one implementation. Referring first to FIG. 5A, initially, the teleportation service 26-1 unilaterally, or at the request of the MFA service 28-1, reserves the qubit 18-N for purposes of being entangled with a qubit of the quantum computing system 12-2 (FIG. 5A, step 3000). The teleportation service 26-1 sends a message to the teleportation service 26-2 of the quantum computing system 12-2 informing the teleportation service 26-2 that the qubit 18-N has been reserved, and providing addressing and other suitable information to the teleportation service 26-2 to facilitate entanglement of the qubit 18-N with the qubit 20-M of the quantum computing system 12-2 (FIG. 5A, step 3002). The teleportation service 26-2 reserves the qubit 20-M for purposes of being entangled with the qubit 18-N, and causes an entanglement between the qubits 18-N and 20-M (FIG. 5A, steps 3004, 3006).

Subsequently, the requestor process 34 attempts to access a protected resource 30, such as the file 32-1 (FIG. 3) (FIG. 5A, step 3008). As part of the access attempt, the file system of the quantum computing system 12-1 invokes the MFA service 28-1. The MFA service 28-1 requests a classical authentication of the requestor process 34 (FIG. 5A, step 3010). The requestor process 34 provides a user identifier and a password to the MFA service 28-1 (FIG. 5A, step 3012). The MFA service 28-1 determines that the provided user identifier and password are correct and that the requestor process 34 has thus successfully passed the classical authentication (FIG. 5A, step 3014).

The MFA service 28-1 sends a request to the MFA service 28-2 for a quantum authentication (FIG. 5A, step 3016). The MFA service 28-2 generates a qubit authentication state, and sends qubit authentication state to the MFA service 28-1 (FIG. 5A, steps 3018-3020). The MFA service 28-1 reserves the qubit 18-1, and sends the qubit authentication state and a qubit identifier of the qubit 18-1 to the requestor process 34 (FIG. 5A, steps 3022).

Referring now to FIG. 5B, the requestor process 34 receives the qubit authentication state and the qubit identifier of the qubit 18-1, and manipulates the qubit 18-1, such as by performing the appropriate qubit operations, to place the qubit 18-1 into the qubit authentication state (FIG. 5B, step 3024). The MFA service 28-1 determines that the qubit 18-1 has been manipulated (FIG. 5B, step 3026). In some examples, the MFA service 28-1 may be informed by the requestor process 34 that the qubit 18-1 has been manipulated. In other examples, the MFA service 28-1 may continuously monitor the qubit 18-1 and determine when the physical state of the qubit 18-1 has changed, indicating that the qubit 18-1 has been manipulated.

The MFA service 28-1 requests that the teleportation service 26-1 teleport the physical characteristics of the qubit 18-1 to the quantum computing system 12-2 (FIG. 5B, step 3028). The teleportation service 26-1 causes the physical characteristics of the qubit 18-1 to be teleported to the quantum computing system 12-2 using the entangled pair of qubits 18-N and 20-M (FIG. 5B, step 3030). The MFA service 28-2 determines that the qubit 20-M has been manipulated to match the qubit authentication state (FIG. 5B, step 3032). The MFA service 28-2 sends a message to the MFA service 28-1 indicating that the requestor process 34 has been properly authenticated (FIG. 5B, step 3034). The MFA service 28-1 grants permission to the requestor process 34 to access the protected resource 30 (FIG. 5B, step 3036).

Figure 6:
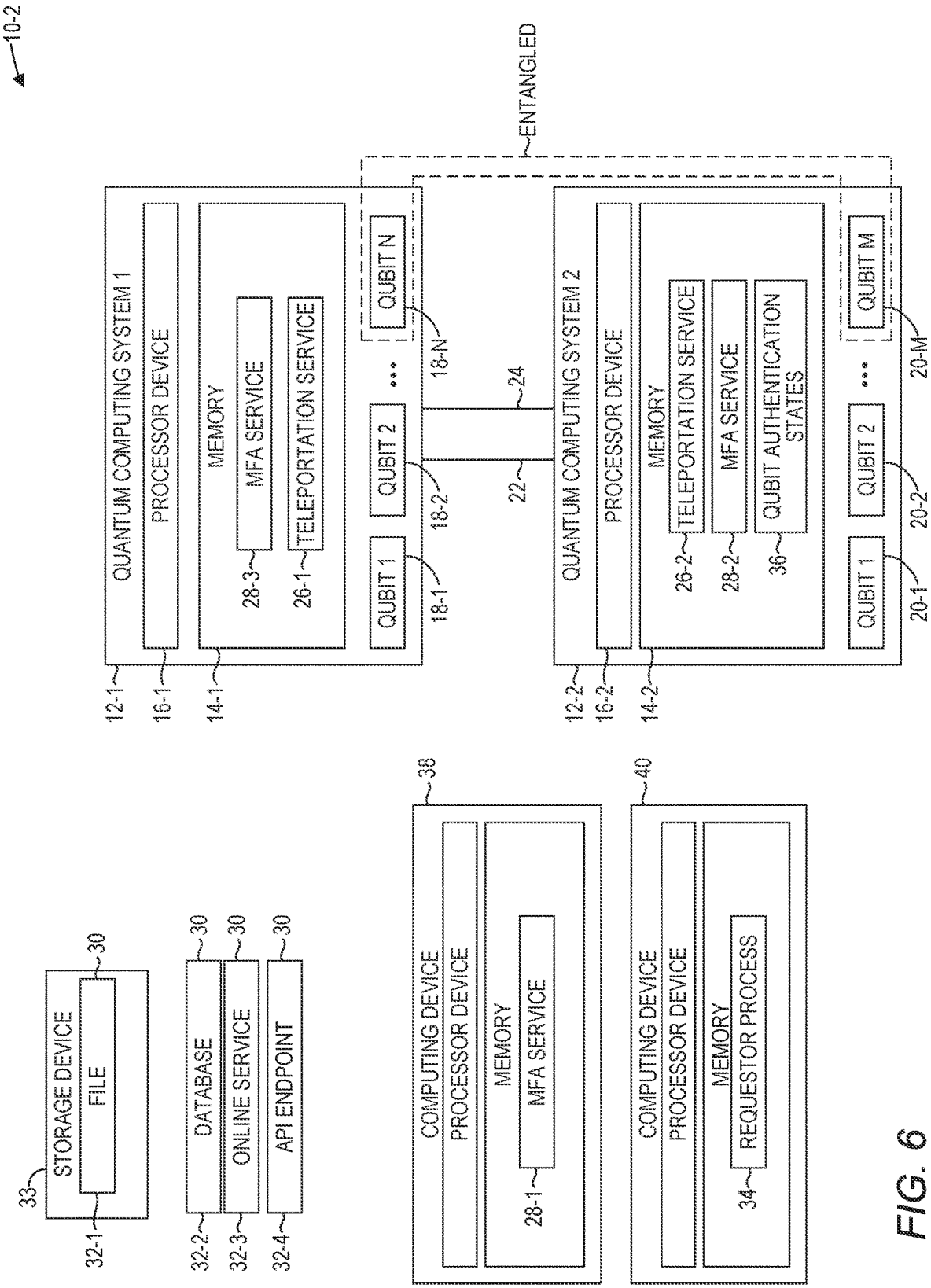
FIG. 6 is a block diagram of an environment suitable for implementing quantum authentication of protected resources according to yet another implementation.

FIG. 6 is a block diagram of an environment 10-2 suitable for implementing quantum authentication of protected resources according to yet another implementation. In this example, the MFA service 28-1 executes on a computing device 38 that is a classical computing device, and the requestor process 34 executes on a computing device 40 that is also a classical computing device.

The requestor process 34 attempts to access a protected resource 30, such as the file 32-1. As part of the attempt to access the file 32-1, the MFA service 28-1 is invoked. The MFA service 28-1 may initially send the requestor process 34 the request for the classical authentication, such as a user identifier and a password, or any other desirable mechanism used on classical computing devices to authenticate a process. In response, the requestor process 34 sends authentication information to the MFA service 28-1. The MFA service 28-1, in this example, determines that the authentication information is valid.

The MFA service 28-1 then sends a message requesting a quantum authentication to an MFA service 28-3 executing on the quantum computing system 12-1. The MFA service 28-3 sends a request for quantum authentication to the MFA service 28-2 on the quantum computing system 12-2.

The MFA service 28-2 receives the request for quantum authentication and generates a qubit authentication state. The MFA service 28-2 sends the qubit authentication state to the MFA service 28-3. The MFA service 28-3 receives the qubit authentication state that identifies the desired state of the qubit. The MFA service 28-3 may then reserve an available qubit, such as the qubit 18-1. The MFA service 28-3 provides, to the MFA service 28-1, a qubit identifier that identifies the qubit 18-1, and the qubit authentication state. The MFA service 28-1 provides, to the requestor process 34, the qubit identifier and the qubit authentication state. The requestor process 34 receives the qubit identifier that identifies the qubit 18-1, and the qubit authentication state, and sends commands to the quantum computing system 12-1 that cause the desired manipulations on the qubit 18-1 to place the qubit 18-1 in the qubit authentication state. The requestor process 34 may inform the MFA service 28-1 that the requestor process 34 has caused the qubit 18-1 to have the qubit authentication state. The MFA service 28-1 may then inform the MFA service 28-3 that the requestor process 34 has indicated that the requestor process 34 has manipulated the qubit 18-1. In other implementations, the MFA service 28-3 may detect that the qubit 18-1 has been manipulated.

The MFA service 28-3 invokes the teleportation service 26-1 identifying the qubit 18-1. The teleportation service 26-1, using the quantum channel 24 and the entangled qubit 18-N, teleports the physical characteristics of the qubit 18-1 to the qubit 20-M. The MFA service 28-2 determines that the qubit 20-M has been altered. The MFA service 28-2 determines the physical characteristics of the qubit 20-M and compares the physical characteristics to the qubit authentication state previously sent to the MFA service 28-3. In this example, the MFA service 28-2 determines that the physical characteristics match the qubit authentication state. In response to this determination, the MFA service 28-2 sends a successful quantum authentication message to the MFA service 28-3. The MFA service 28-3 receives the successful quantum authentication message and sends the successful quantum authentication message to the MFA service 28-1. The MFA service 28-1 receives the successful quantum authentication message and grants the requestor process 34 access to the file 32-1.

Figure 7:
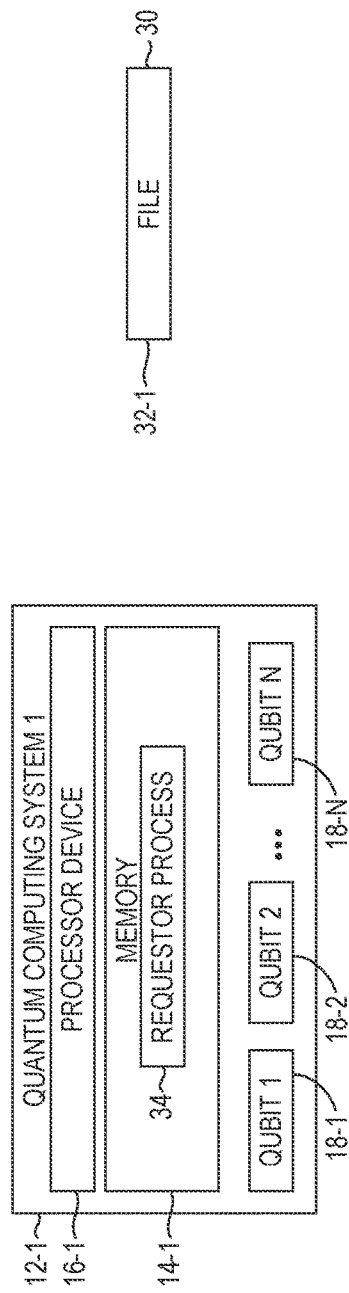
FIG. 7 is a simplified block diagram of the environment illustrated in FIG. 1 according to one implementation.

FIG. 7 is a simplified block diagram of the environment 10 illustrated in FIG. 1 according to one implementation. The environment 10 includes a computing device, in the form of the quantum computing system 12-1, which in turn includes the processor device 16-1 coupled to the memory 14-1. The processor device 16-1 is to receive an access request to allow the requestor process 34 to access a protected resource 30 such as the file 32-1. The processor device 16-1 is further to send, to the requestor process 34, a qubit authentication state that identifies a desired state of the qubit 18-1. The processor device 16-1 is to determine that the requestor process 34 has caused the qubit 18-1 to have the qubit authentication state. The processor device 16-1 is to, based at least in part on determining that the requestor process 34 has caused the qubit 18-1 to have the qubit authentication state, grant, to the requestor process 34, access to the protected resource 30.

Figure 8:
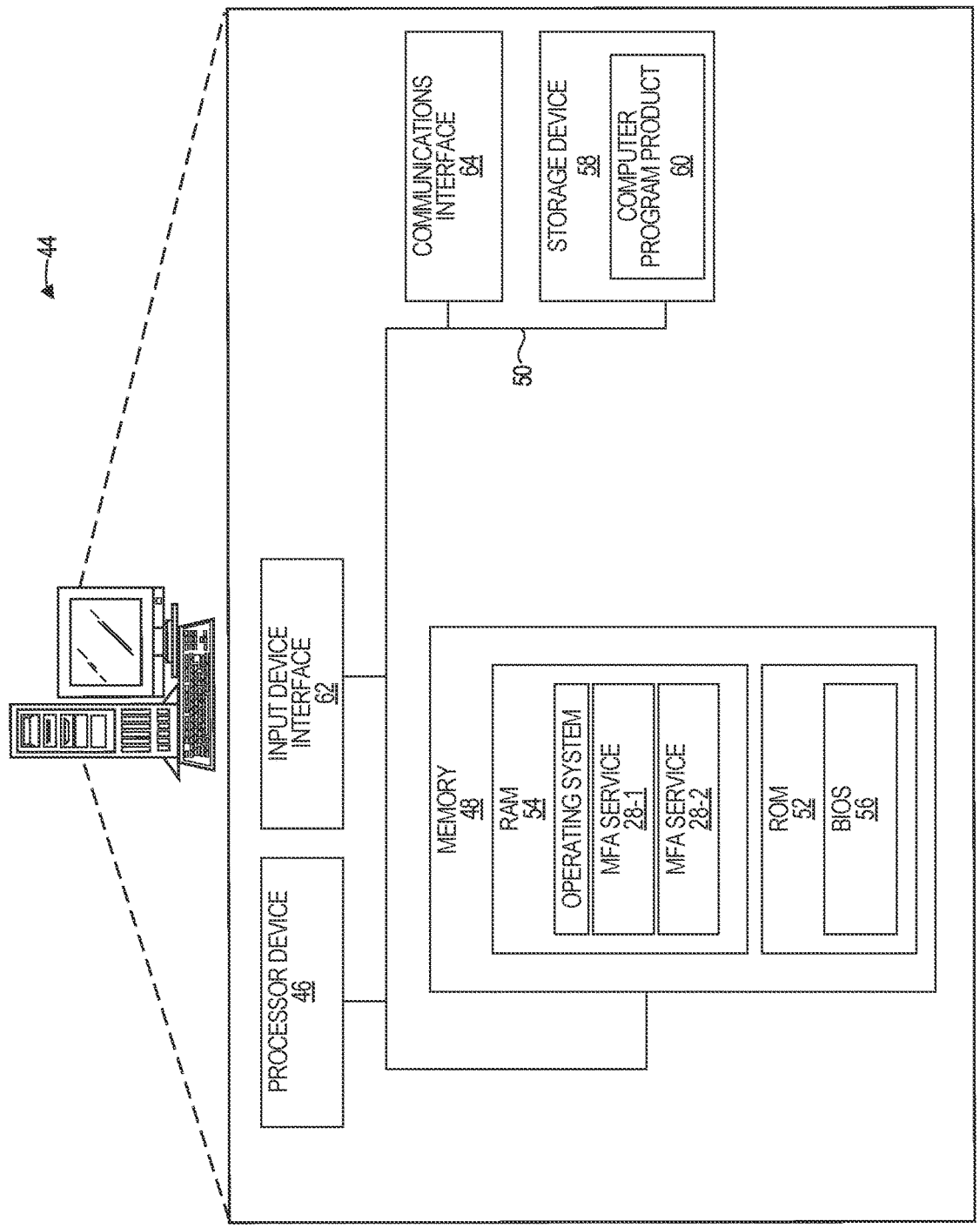
FIG. 8 is a block diagram of a computing device suitable for implementing the implementations disclosed herein.

FIG. 8 is a block diagram of a computing device 44 suitable for implementing any of the computing devices illustrated herein, such as the quantum computing system 12-1, quantum computing system 12-2, or the classical computing device 38. The computing device 44 may comprise any classical computing device or quantum computing system capable of including firmware, hardware, and/or executing software instructions to implement the functionality described herein. The computing device 44 includes a processor device 46, a memory 48, and a system bus 50. The system bus 50 provides an interface for system components including, but not limited to, the memory 48 and the processor device 46. The processor device 46 can be any commercially available or proprietary processor.

The system bus 50 may be any of several types of bus structures that may further interconnect to a memory bus (with or without a memory controller), a peripheral bus, and/or a local bus using any of a variety of commercially available bus architectures. The memory 48 may include non-volatile memory 52 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 52 and can include the basic routines that help to transfer information between elements within the computing device 44. The volatile memory 54 may also include a high-speed RAM, such as static RAM, for caching data.

The computing device 44 may further include or be coupled to a non-transitory computer-readable storage medium such as a storage device 58, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 58 and in the volatile memory 54, including an operating system and one or more program modules, such as the MFA service 28-1 or the MFA service 28-2, which may implement the functionality described herein in whole or in part. All or a portion of the examples may be implemented as a computer program product 60 stored on a transitory or non-transitory computer-usable or computer-readable storage medium, such as the storage device 58, which includes complex programming instructions, such as complex computer-readable program code, to cause the processor device 46 to carry out the steps described herein. Thus, the computer-readable program code can comprise software instructions for implementing the functionality of the examples described herein when executed on the processor device 46. The processor device 46, in conjunction with the MFA services 28-1 or 28-2 in the volatile memory 54, may serve as a controller, or control system, for the computing device 44 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 46 through an input device interface 62 that is coupled to the system bus 50 but can be connected by other interfaces such as a parallel port, an Institute of Electrical and Electronic Engineers (IEEE) 1394 serial port, a Universal Serial Bus (USB) port, an IR interface, and the like. The computing device 44 may also include a communications interface 64 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a computing device comprising a processor device, an access request to allow a requestor process to access a protected resource;
sending, by the computing device to the requestor process, a qubit authentication state that identifies a desired state of a qubit;
determining, by the computing device, that the requestor process has manipulated physical characteristics of the qubit, such that the physical characteristics of the qubit match the qubit authentication state; and
based at least in part on determining that the requestor process has manipulated the physical characteristics of the qubit to match the qubit authentication state, granting, by the computing device to the requestor process, access to the protected resource.

2. The method of claim 1 further comprising:
providing, by the computing device to the requestor process, a qubit identifier that identifies the qubit on a quantum computing system which the requestor process is to manipulate to match the qubit authentication state.

3. The method of claim 1 further comprising:
prior to sending the qubit authentication state that identifies the desired state of the qubit to the requestor process, sending, by the computing device to a first quantum computing system, a request for a quantum authentication; and
receiving, by the computing device from the first quantum computing system, the qubit authentication state that identifies the desired state of the qubit.

4. The method of claim 3 wherein the computing device comprises a second quantum computing system.

5. The method of claim 4 further comprising:
receiving, by the second quantum computing system, a message indicating that the requestor process has manipulated the physical characteristics of the qubit on the second quantum computing system to match the qubit authentication state; and
in response to the message, causing the second quantum computing system to teleport, using quantum teleportation, the physical characteristics of the qubit on the second quantum computing system to the first quantum computing system.

6. The method of claim 5 further comprising:
receiving, by the first quantum computing system, the request for the quantum authentication;
generating the qubit authentication state;
sending, by the first quantum computing system to the second quantum computing system, the qubit authentication state;
determining, by the first quantum computing system, that a qubit implemented by the first quantum computing system has been altered;
determining that the qubit implemented by the first quantum computing system matches the qubit authentication state; and
in response to determining that the qubit implemented by the first quantum computing system matches the qubit authentication state, sending, by the first quantum computing system to the second quantum computing system, a successful quantum authentication message indicating a successful quantum authentication by the requestor process.

7. The method of claim 1 further comprising:
sending, by the computing device to the requestor process, a request for a classical authentication;
receiving, by the computing device from the requestor process, authentication information;
determining, by the computing device, that the authentication information is valid; and
wherein granting, by the computing device to the requestor process, the access to the protected resource further comprises:
based on determining that the requestor process has manipulated the physical characteristics of the qubit to match the qubit authentication state and on the authentication information, granting, by the computing device to the requestor process, the access to the protected resource.

8. The method of claim 1 wherein the qubit authentication state comprises a specified spin state and a specified polarization state.

9. The method of claim 1 wherein the qubit authentication state comprises a textual identifier.

10. The method of claim 1 wherein the protected resource comprises one of a file and an online service.

11. A method comprising:
receiving, by a computing device comprising a processor device, an access request to allow a requestor process to access a protected resource;
sending, by the computing device to a first quantum computing system, a request for a quantum authentication;
receiving, by the computing device from the first quantum computing system, a qubit authentication state that identifies a desired state of a qubit;
sending, by the computing device to the requestor process, the qubit authentication state;
receiving, by the computing device from the first quantum computing system, a successful quantum authentication message indicating a successful quantum authentication by the requestor process, wherein the successful quantum authentication indicates that the requestor process has manipulated physical characteristics of the qubit, such that the physical characteristics of the qubit match the qubit authentication state; and
based at least in part on the successful quantum authentication message, granting, by the computing device to the requestor process, access to the protected resource.

12. The method of claim 11 further comprising:
sending, by the computing device to the requestor process, a request for a classical authentication;
receiving, by the computing device from the requestor process, authentication information;
determining, by the computing device, that the authentication information is valid; and
wherein granting, by the computing device to the requestor process, the access to the protected resource further comprises:
based on the successful quantum authentication message and on the authentication information, granting, by the computing device to the requestor process, the access to the protected resource.

13. The method of claim 11 wherein the qubit authentication state comprises a specified spin state and a specified polarization state.

14. A computing device, comprising:
a memory; and
a processor device coupled to the memory to:
receive an access request to allow a requestor process to access a protected resource;
send, to the requestor process, a qubit authentication state that identifies a desired state of a qubit;
determine that the requestor process has manipulated physical characteristics of the qubit, such that the physical characteristics of the qubit match the qubit authentication state; and
based at least in part on determining that the requestor process has manipulated the physical characteristics of the qubit to match the qubit authentication state, grant, to the requestor process, access to the protected resource.

15. The computing device of claim 14, wherein the processor device is further to provide, to the requestor process, a qubit identifier that identifies the qubit on a quantum computing system which the requestor process is to manipulate to match the qubit authentication state.

16. The computing device of claim 14, wherein the processor device is further to:
prior to sending the qubit authentication state that identifies the desired state of the qubit to the requestor process, send, to a first quantum computing system, a request for a quantum authentication; and
receive, from the first quantum computing system, the qubit authentication state that identifies the desired state of the qubit.

17. The computing device of claim 16 wherein the computing device comprises a second quantum computing system.

18. The computing device of claim 14 wherein the qubit authentication state comprises a specified spin state and a specified polarization state.

19. The computing device of claim 14 wherein the qubit authentication state comprises a textual identifier.

20. The computing device of claim 14 wherein the protected resource comprises one of a file and an online service.

* * * * *